H. J. DOUGHTY.
METHOD OF AND APPARATUS FOR MAKING TIRES.
APPLICATION FILED AUG. 30, 1915.
1,356,132.
Patented Oct. 19, 1920.
2 SHEETS—SHEET 1.
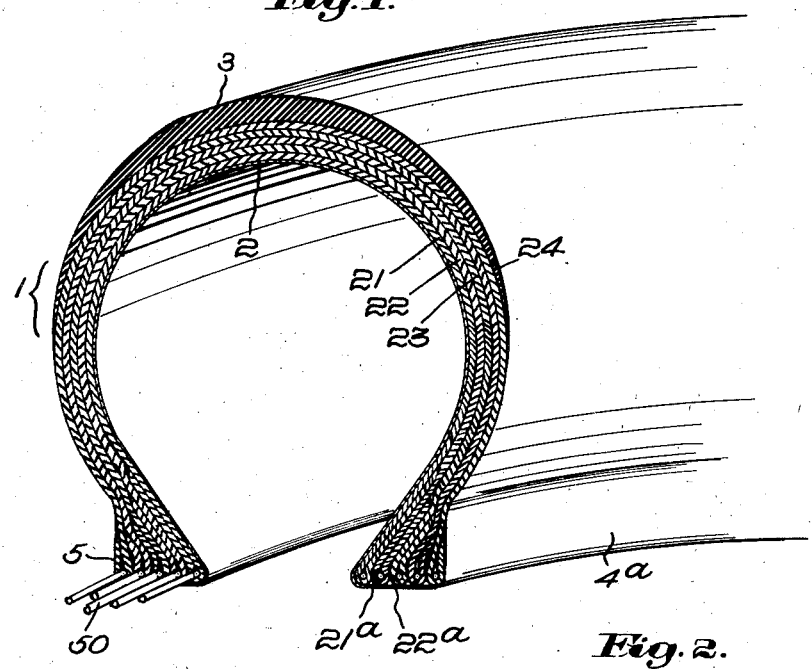
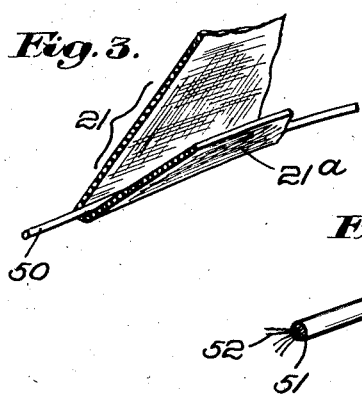
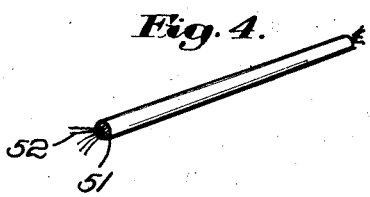
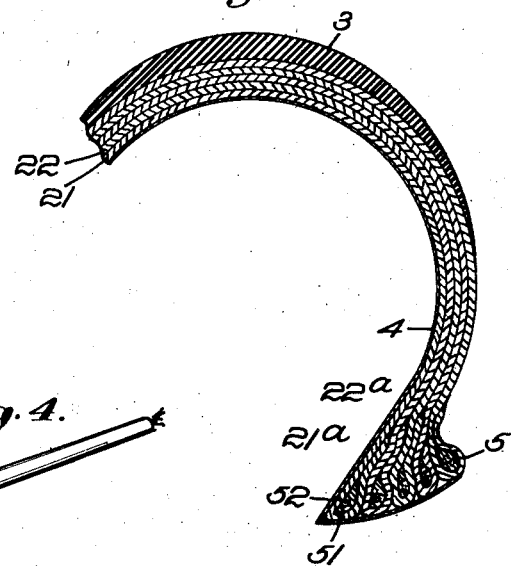
Witnesses
Llewellyn Richards
Edward W. Baker.
Inventor
Henry J. Doughty
By Emery, Booth, Janney + Varney
Attorney.

H. J. DOUGHTY.
METHOD OF AND APPARATUS FOR MAKING TIRES.
APPLICATION FILED AUG. 30, 1915.
1,356,132.
Patented Oct. 19, 1920.
2 SHEETS—SHEET 2.
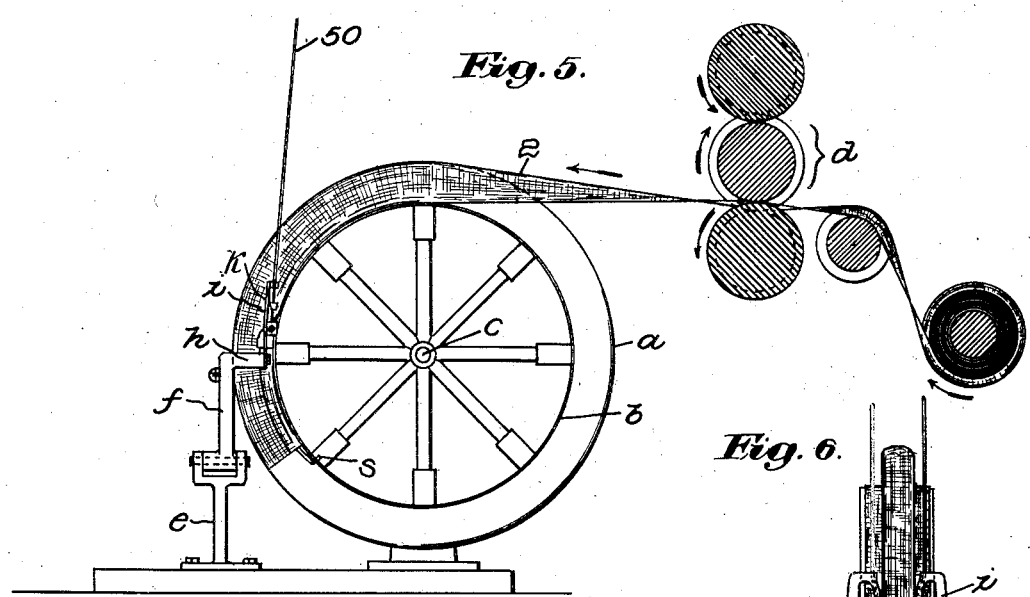
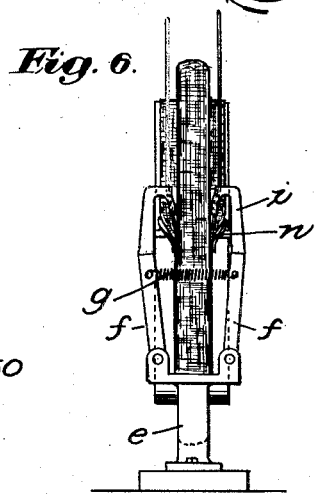
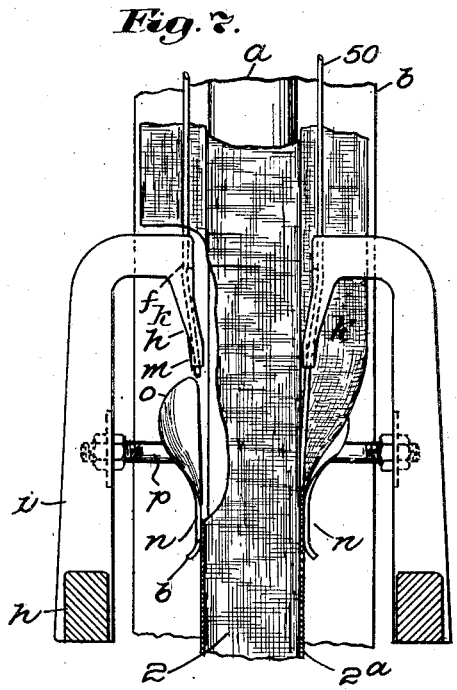
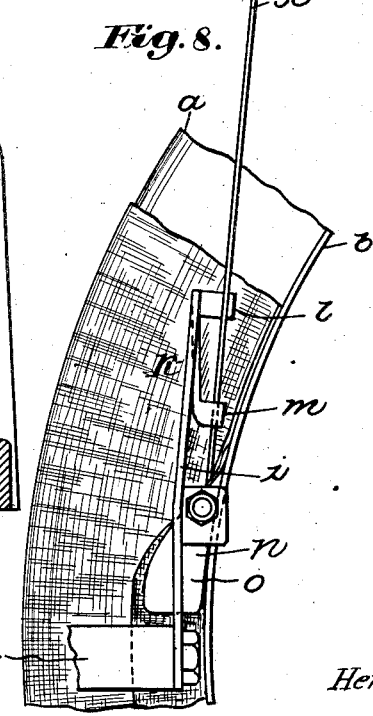
Witnesses
Llewellyn Richards
Edward W. Baker.
Inventor
Henry J. Doughty.
By Emery, Booth, Janney & Varney
Attorneys.

UNITED STATES PATENT OFFICE.

HENRY J. DOUGHTY, OF PROVIDENCE, RHODE ISLAND, ASSIGNOR TO DOUGHTY TIRE COMPANY, OF PORTLAND, MAINE, A CORPORATION OF MAINE.

METHOD OF AND APPARATUS FOR MAKING TIRES.

1,356,132.

Specification of Letters Patent.   Patented Oct. 19, 1920.

Application filed August 30, 1915. Serial No. 47,913.

*To all whom it may concern:*

Be it known that I, HENRY J. DOUGHTY, a citizen of the United States, and a resident of Providence, in the county of Providence and State of Rhode Island, have invented an Improvement in Methods of and Apparatus for Making Tires, of which the following description, in connection with the accompanying drawings, is a specification, like characters on the drawings representing like parts.

This invention relates to a process of manufacturing vehicle tires and to an apparatus adaptable for use in carrying out the same.

My invention will be best understood by referring to the following description taken in connection with the accompanying drawings wherein I have shown two forms of tire constructed according to my invention and an illustrative example of an apparatus which may be used in making them according to my process.

In the drawings:—

Figure 1 is a perspective view of a portion of a tire of the straight side type constructed according to my invenion, Fig. 2 is a fragmentary section of a tire of the clencher type, Fig. 3 is a detailed view showing how the laminations of the carcass are engaged with the bead forming elements, Fig. 4 is a view of another form of bead forming element, Fig. 5 is a side elevation of an apparatus acording to my invention, Fig. 6 is an edge view thereof, Fig. 7 is a view of a portion of Fig. 6 on an enlarged scale showing how the bead forming elements are built into the carcass, and Fig. 8 is a side view showing the same members.

My invention has more particularly to do with the construction of the so-called shoe or outer tube 1 of a tire, which as shown in Figs. 1 and 2 comprises a carcass 2 formed of laminations 21, 22, 23 and 24 of frictioned fabric, an outer rubber tread 3, an inner or lining layer of fine fabric 4 and beads or holding members 5.

My invention relates more particularly to the construction of the carcass 2 and the beads 5.

The construction of my tire will be best understood if I describe it concurrently with the process by which it is made and the apparatus used. Referring, therefore, to Figs. 1 and 5, I construct the carcass 2 of a single length of fabric, preferably woven both to the transverse form of the tire and to the circumferential pitch thereof. This fabric is built up into a tire carcass on the former shown in Fig. 5, which comprises a central part $a$, shaped to the form of the tire, and the lateral flanges $b$, the whole forming a wheel rotatable on the axis $c$. The fabric 2 is led through the calendar $d$, where it receives its coating or friction of rubber, and is wound around the former $a$ any desired number of times to form a carcass of the thickness and strength desired. In Fig. 1 I have shown four of such laminations 21, 22, 23 and 24 and it will be noted that the edges of each are turned over as shown at $21^a$ and $22^a$ and receive the turns of the wires 50 which form the beads.

The manner in which these wires are built up into the carcass, I will now describe.

Referring to Figs. 5 and 6, it will be seen that I have provided near the former $a$, a standard $e$, on which two arms are pivoted to move transversely to the former, a spring $g$ connecting these arms and normally pressing them together and toward the sides thereof. Each of the arms $f$ in the form of invention shown has an extension $h$, extending inwardly toward the center of the former and from this extension rises member $i$ which carries the bead forming devices. These comprise the guide $k$ provided at the extreme end of the member $i$ to direct the bead forming wire 50 by any suitable means, such for example as the opposed hooks $l$ and $m$ shown in Figs. 7 and 8 and the folding elements $n$ disposed below these guides and carried on the arm $i$ by means of stud bolts $p$, these folding elements being in form somewhat like a mold board of a plow and comprising the part $o$ which goes across the angle formed between the central part $a$ of the former and the flanges $b$.

The operation of this apparatus and the method of building the tire may now be readily understood. A wire 50 for each bead is led from any suitable holder (not shown) through the guide $k$ and engaged in any suitable manner with the former, as shown for example at $s$ in Fig. 5. It will be apparent that as the fabric 2 is drawn forward by rotating the former $a$ that the wires will overlie the edges of the fabric, which are spread out on the flanges $b$ and that as the fabric is drawn down the edges will be engaged by the share-like holders $n$, which will turn them up from the flanges $b$ and against the body of the fabric, as clearly shown in Fig. 7. In so doing they will lodge the wires 50 in the folds thus formed and the tire carcass finally consists of a spiral winding of fabric with the edges of each of the turns of which are engaged corresponding turns of a spiral bead-forming wire which has been built in with the carcass progressively as it is made.

When a sufficient number of turns to form the desired thickness of carcass have been wound upon the former, the wire and fabric are cut off, the tread 3 applied and the whole vulcanized in the usual manner into a unit. The wire 50 may be and preferably is coppered to permit the rubber on the fabric to adhere more securely thereto.

Although the description given above has for convenience concerned itself solely with the straight-sided, wire-beaded tire shown in Fig. 1, it is obvious that my invention is not limited to such a tire and I have shown by way of an example of another construction, a clencher bead in Fig. 2. In this case the tire is built up in substantially the same way, but instead of a wire 50, a filling element such as the rubber cord 51, which may or may not be reinforced with cord or wire 52, is employed. This filling element builds out the edges of the shoe to clencher form as shown in Fig. 2, the rubber cord being a holding element just as the wire 50 is, since it provides for the construction of the holding bead 5.

By the use of my invention a very strong and durable tire is obtained in a very expeditious manner as the wires are laid in the folds of the fabric in an automatic fashion. Each lamination of the tire carcass has its holding element and the whole is, therefore, under even tension. By winding in the bead forming elements progressively as the tire is wound, I am able to position them so that they will lie accurately side by side as shown in Figs. 1 and 2 and form a smooth surfaced bead to engage the surface of the wheel rim. The edges of the fabric being turned about the bead forming elements, the full strength of the fabric is retained and the fastening of the laminations at the bead is, therefore, very secure.

While I have described a specific form of apparatus and a limited number of modifications of tire which may be built therewith, it will be understood that I have done this merely by way of illustration and that my invention is capable of various embodiments as indicated by the scope of the accompanying claims.

I claim:

1. The process of making a tire comprising the following steps: winding a fabric circumferentially to form and at the same time winding in bead-forming elements, thus associating them with the edges of the fabric as the windings proceed.

2. The process of making a tire comprising the following steps: winding a fabric circumferentially to form with the edges thereof returned to provide pockets and at the same time winding in bead-forming elements, thus applying them to said pockets as the windings proceed.

3. The process of making a tire comprising the following steps: winding a fabric circumferentially to form and at the same time winding in bead-forming elements, thus associating them with the edges of the fabric as the windings proceed and in position adjacent the edges thereof and, as the windings proceed, returning the edges of the fabric about said elements.

4. The process of making a tire comprising the following steps: winding a fabric circumferentially to form, applying bead-forming elements to the edges thereof and returning the edges about the elements, the two latter operations taking place progressively and in synchrony with said winding.

5. The process of making a tire comprising the following steps: winding a fabric circumferentially to form in a plurality of laminations and at the same time winding in bead-forming elements, thus associating them with the edges of the fabric as the windings proceed.

6. The process of making a tire comprising the following steps: winding a fabric circumferentially to form in a plurality of laminations with the edges thereof returned to provide pockets and at the same time winding in bead-forming elements, thus applying them to said pockets as the windings proceeed.

7. The process of making a tire comprising the following steps: winding a fabric circumferentially to form in a plurality of laminations and at the same time winding in bead-forming elements, thus associating them with the edges of the fabric as the windings proceed and in position adjacent the edges thereof and, as the windings proceed, returning the edges of the fabric about said elements.

8. The process of making a tire comprising the following steps: winding a fabric circumferentially to form in a plurality of laminations applying bead-forming elements to the edges thereof and returning the edges about the elements, the two latter operations taking place progressively and in synchrony with said winding.

9. The process of making a tire comprising the following steps: winding a fabric circumferentially to form in a plurality of laminations and at the same time winding in a pair of bead-forming elements in a corresponding plurality of circumferential turns, thus associating them with the edges of the fabric as the windings proceed.

10. The process of making a tire comprising the following steps: winding a fabric circumferentially to form in a plurality of laminations with the edges thereof returned to provide pockets and at the same time winding in a pair of bead-forming elements in a corresponding plurality of circumferential turns, thus applying them to said pockets as the windings proceed.

11. The process of making a tire comprising the following steps: winding a fabric circumferentially to form in a plurality of laminations and at the same time winding in a pair of bead-forming elements in a corresponding plurality of circumferential turns, thus associating them with the edges of the fabric as the windings proceed and in position adjacent the edges thereof and, as the windings proceed, returning the edges of the fabric about said elements.

12. The process of making a tire comprising the following steps: winding a fabric circumferentially to form in a plurality of laminations applying bead-forming elements to the edges thereof in a corresponding plurality of circumferential turns and returning the edges about the elements, the two latter operations taking place progressively and in synchrony with said winding.

13. Tire making apparatus comprising a former adapted to receive a fabric, a folder, the former and folder being relatively movable, the folder being adapted to return the edges of the fabric on the body thereof during such movement.

14. Tire making apparatus comprising a former having a part arched to tire form and lateral flanges, said former being adapted to receive a fabric, folders adjacent said flanges, the folders and former being relatively movable, the folders acting to fold fabric received on said flanges against the said arched part.

15. Tire making apparatus comprising a former adapted to receive a fabric, a folder, the former and folder being relatively movable, the folder being adapted to return the edges of the fabric on the body thereof during such movement and means to guide a funiform bead-forming element into the folds so formed.

16. Tire making apparatus comprising a former having a part arched to tire form and lateral flanges, said former being adapted to receive a fabric, folders adjacent said flanges, the folders and former being relatively movable, the folders acting to fold fabric received on said flanges against the said arched part and means to guide funiform bead-forming elements into the folds so formed.

17. Tire apparatus comprising in combination a rotatable former adapted to receive a fabric, arms pivoted to swing to and from the sides of the former and folders carried by said arms to return the edges of said fabric on the body thereof.

18. Tire apparatus comprising in combination a rotatable former adapted to receive a fabric, arms pivoted to swing to and from the sides of the former and folders carried by said arms to return the edges of said fabric on the body thereof and resilient means to hold said arms in operative relation to the former.

19. Tire apparatus comprising in combination a rotatable former adapted to receive a fabric, arms pivoted to swing to and from the sides of the former, folders carried by said arms to return the edges of said fabric on the body thereof and means also carried by said arms to guide bead-forming elements into the folds so formed.

20. Tire apparatus comprising in combination a rotatable former adapted to receive a fabric, arms pivoted to swing to and from the sides of the former, folders carried by said arms to return the edges of said fabric on the body thereof and means also carried by said arms to guide bead-forming elements into the folds so formed and resilient means to hold said arms in operative relation to the former.

21. Tire making apparatus comprising in combination a rotatable former having a part arched to tire form and lateral flanges, said former being adapted to receive a fabric, arms pivoted to swing toward and from the former and folders carried by said arms and adapted to lie in operative relation to said flanges to fold fabric received thereon against said arched part.

22. Tire making apparatus comprising in combination a rotatable former having a part arched to tire form and lateral flanges, said former being adapted to receive a fabric, arms pivoted to swing toward and from the former and folders carried by said arms and adapted to lie in operative relation to said flanges to fold fabric received thereon against said arched part and means to guide bead-forming elements into the folds so formed.

23. Tire making apparatus comprising in combination a rotatable former having a part arched to tire form and lateral flanges said former being adapted to receive a fabric, arms pivoted to swing toward and from the former and folders carried by said arms and adapted to lie in operative relation to said flanges to fold fabric received thereon against said arched part and means also carried by said arms to guide bead-forming elements into the folds so formed.

In testimony whereof I have signed my name to this specification, in the presence of two subscribing witnesses.

HENRY J. DOUGHTY.

Witnesses:
FRANK BARNBROOK,
ALFRED H. ATKINSON.